US012011755B2

(12) United States Patent
Saggin et al.

(10) Patent No.: US 12,011,755 B2
(45) Date of Patent: Jun. 18, 2024

(54) PUNCH UNIT FOR PUNCHING MACHINE

(71) Applicant: SALVAGNINI ITALIA S.P.A., Sarego (IT)

(72) Inventors: Stefano Saggin, Sarego (IT); Diego Figatti, Sarego (IT); Giovanni Dalla Costa, Sarego (IT)

(73) Assignee: SALVAGNINI ITALIA S.P.A., Sarego (IT)

( * ) Notice: Subject to any disclaimer, the term of this patent is extended or adjusted under 35 U.S.C. 154(b) by 277 days.

(21) Appl. No.: 17/430,091

(22) PCT Filed: Feb. 11, 2020

(86) PCT No.: PCT/IB2020/051071
§ 371 (c)(1),
(2) Date: Aug. 11, 2021

(87) PCT Pub. No.: WO2020/165753
PCT Pub. Date: Aug. 20, 2020

(65) Prior Publication Data
US 2022/0143673 A1 May 12, 2022

(30) Foreign Application Priority Data
Feb. 12, 2019 (IT) ........................ 102019000002039

(51) Int. Cl.
*B21D 28/34* (2006.01)
*B26F 1/04* (2006.01)
*B26F 1/14* (2006.01)

(52) U.S. Cl.
CPC ................ *B21D 28/34* (2013.01); *B26F 1/04* (2013.01); *B26F 1/14* (2013.01)

(58) Field of Classification Search
CPC ... B26F 1/14; B26F 1/04; B21D 28/24; B21D 28/246; B21D 28/34; B21D 28/346; Y10T 83/9476; Y10T 83/9487
See application file for complete search history.

(56) References Cited

U.S. PATENT DOCUMENTS 3,735,993 A * 5/1973 Seibert ................ B23B 31/1071 279/75
5,329,835 A * 7/1994 Timp ..................... B21D 28/34 83/698.71
(Continued)

FOREIGN PATENT DOCUMENTS

CN 1360525 7/2002
CN 102271834 12/2011
(Continued)

OTHER PUBLICATIONS

International Search Report dated Jun. 9, 2020 in International (PCT) Application No. PCT/IB2020/051071.

*Primary Examiner* — Jennifer S Matthews
(74) *Attorney, Agent, or Firm* — Wenderoth, Lind & Ponack, L.L.P.

(57) ABSTRACT

A punch unit associable with a respective punch holder of a punching machine to form a punch assembly comprises a punch tip holder mountable on the respective punch holder and a punch tip housed in, and connected to, the punch tip holder in an assembled configuration; the punch tip holder includes a connecting element coupled to the punch tip; an adapter element shaped and sized so as to be inserted and housed in the respective punch holder and provided with an inner cavity suitable to house the connecting element with the punch tip in the assembled configuration; a locking device housed in the adapter element, which can be operated
(Continued)

manually without tools and arranged for locking or unlocking the connecting element with the punch tip to or from the adapter element.

18 Claims, 7 Drawing Sheets

(56) References Cited

U.S. PATENT DOCUMENTS

| | | | | |
|---|---|---|---|---|
| 6,047,621 | A | 4/2000 | Dries et al. | |
| 6,074,330 | A * | 6/2000 | Ostini | B21D 28/12 83/552 |
| 6,182,545 | B1 | 2/2001 | Janck, Jr. | |
| 6,276,247 | B1 | 8/2001 | Helda | |
| 6,463,839 | B2 * | 10/2002 | Ohtsuka | B21D 45/08 83/698.91 |
| 7,954,404 | B2 * | 6/2011 | Thielges | B21D 28/346 83/684 |
| 8,408,111 | B2 | 4/2013 | Johnston et al. | |
| 8,707,841 | B2 | 4/2014 | Morehead et al. | |
| 9,669,450 | B2 | 6/2017 | Nakai | |
| 9,718,109 | B2 | 8/2017 | Morehead et al. | |
| 9,855,670 | B2 | 1/2018 | Johnston et al. | |
| 2003/0024367 | A1 | 2/2003 | Morehead et al. | |
| 2010/0107832 | A1 | 5/2010 | Johnston et al. | |
| 2010/0206150 | A1 * | 8/2010 | Kraft | B21D 28/34 83/140 |
| 2011/0072948 | A1 | 3/2011 | Belyan et al. | |
| 2011/0132164 | A1 * | 6/2011 | Barandiaran Echeguia | B21D 28/20 83/639.5 |
| 2011/0296969 | A1 | 12/2011 | Lenzotti | |
| 2013/0139667 | A1 * | 6/2013 | Lee | B21D 45/006 29/426.1 |

FOREIGN PATENT DOCUMENTS

| | | |
|---|---|---|
| CN | 102284593 | 12/2011 |
| CN | 102395435 | 3/2012 |
| CN | 202984410 | 6/2013 |
| CN | 104271281 | 1/2015 |
| GB | 143 122 | 5/1920 |
| JP | 11-254057 | 9/1999 |
| RU | 2 703 080 | 10/2019 |
| SU | 1042845 | 9/1983 |
| SU | 1710168 | 2/1992 |

* cited by examiner

Fig. 1
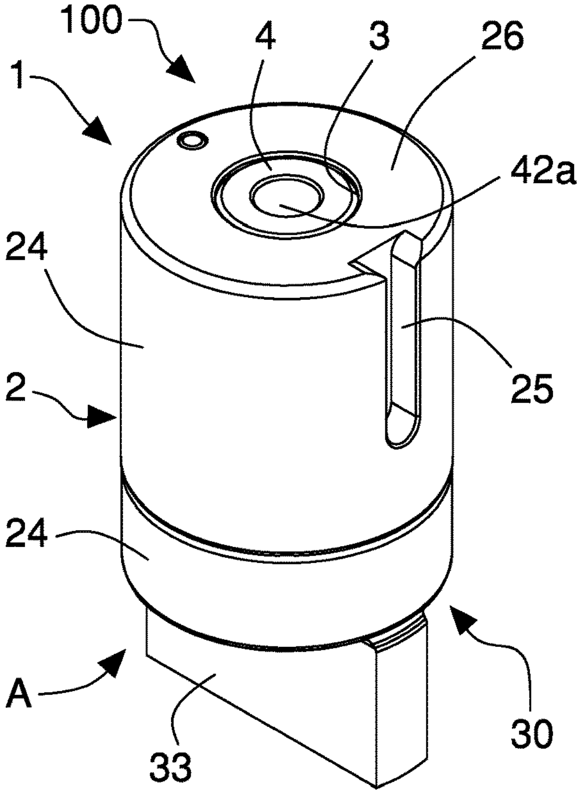
Fig. 2
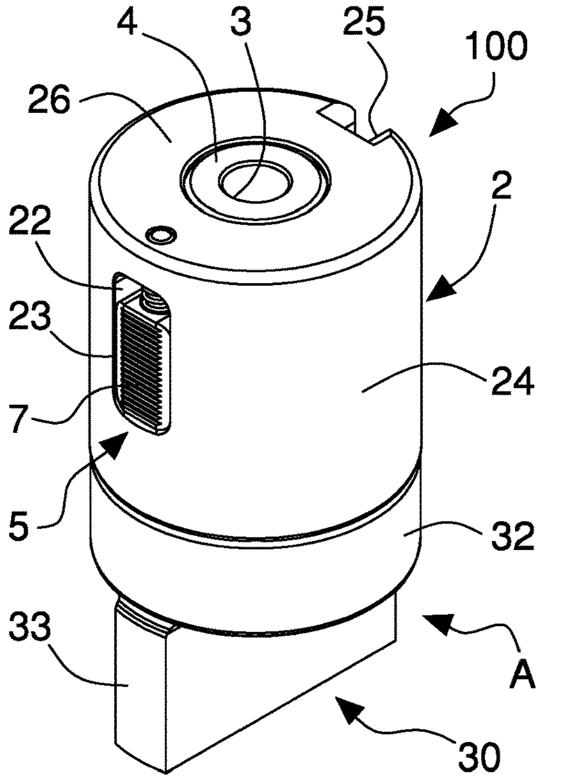
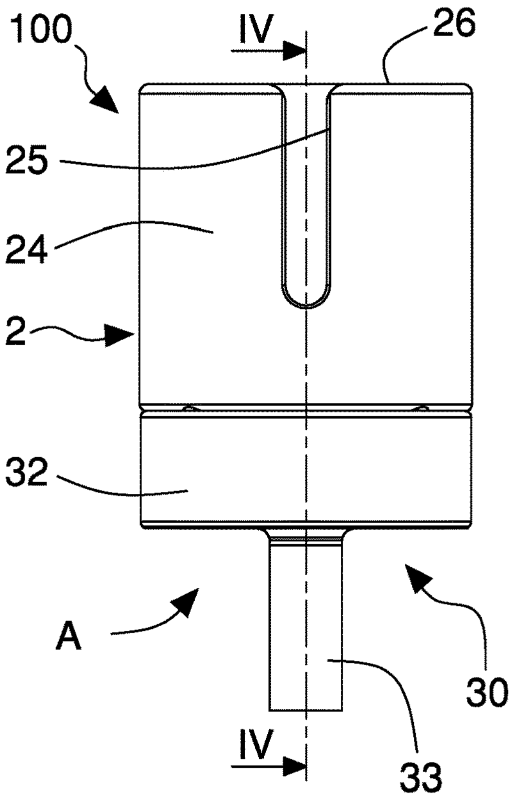
Fig. 3
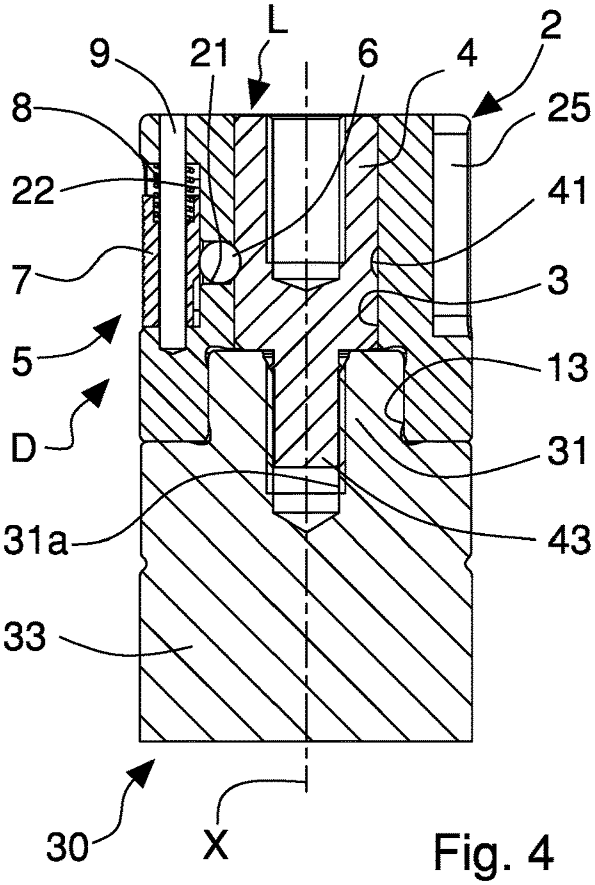
Fig. 4

Fig. 8
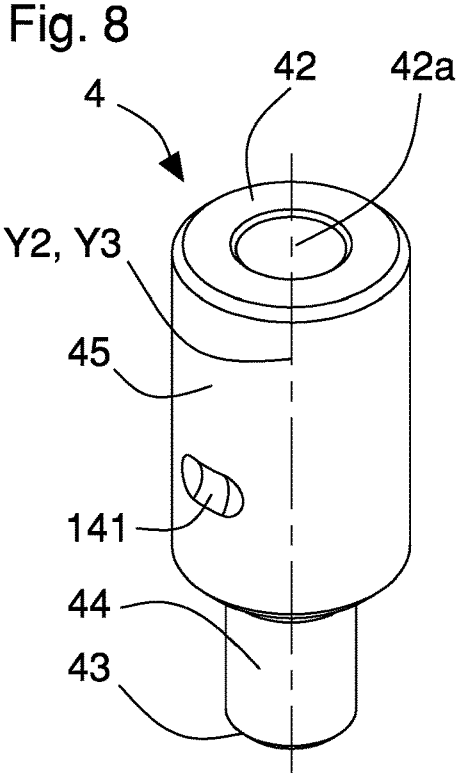
Fig. 9
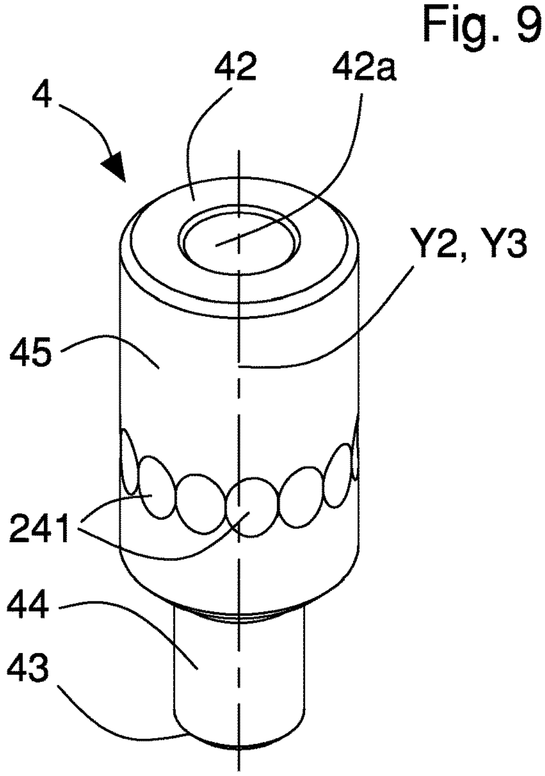
Fig. 10
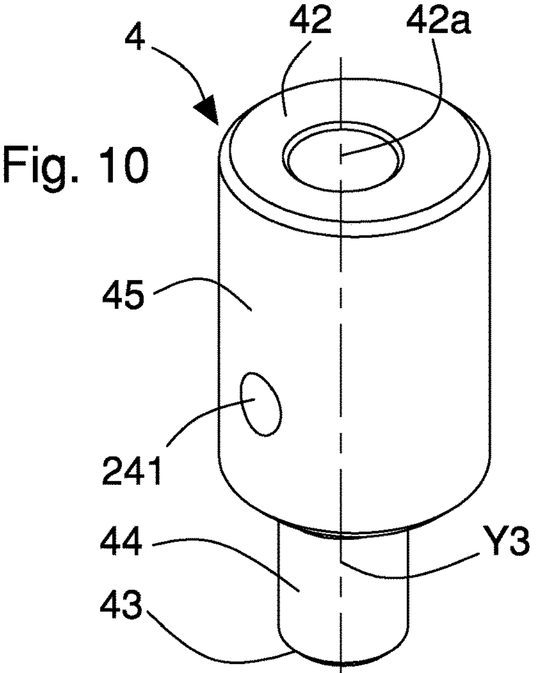
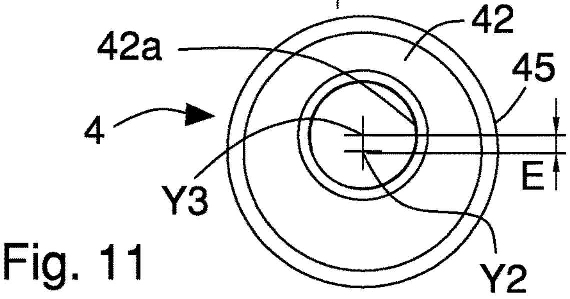
Fig. 11
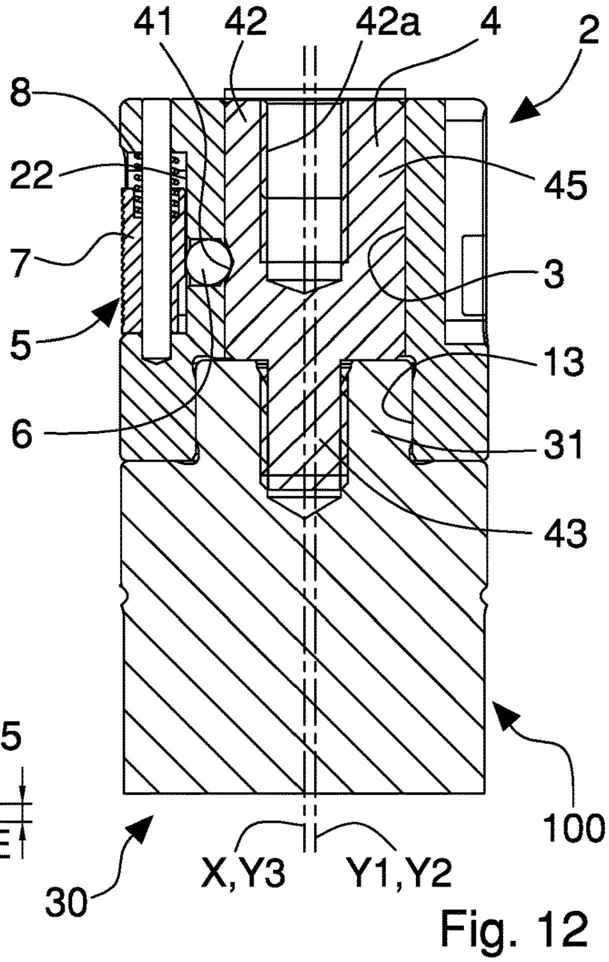
Fig. 12

Fig. 14
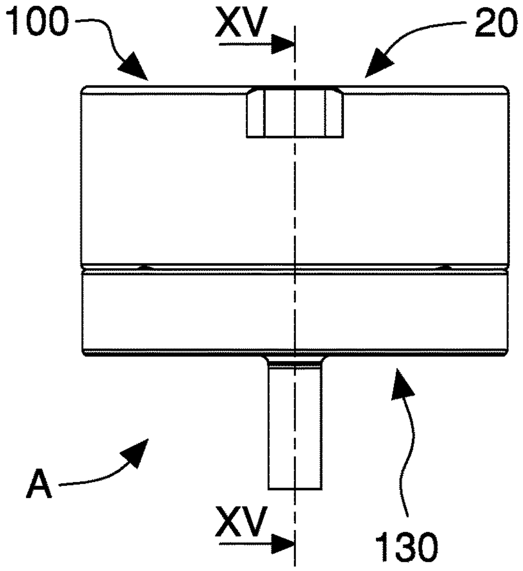
Fig. 15
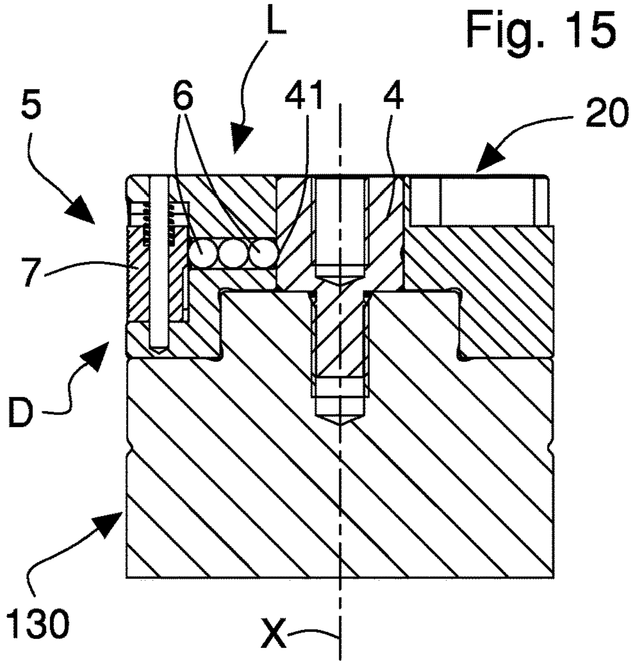
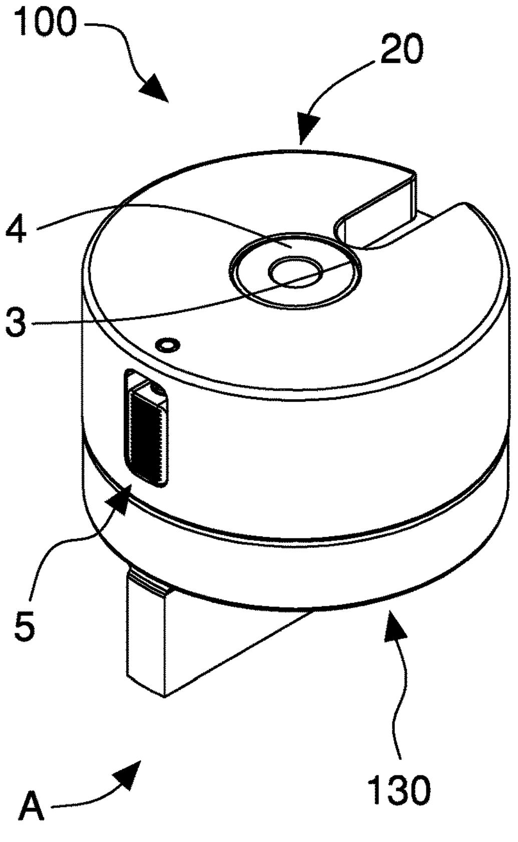
Fig. 16
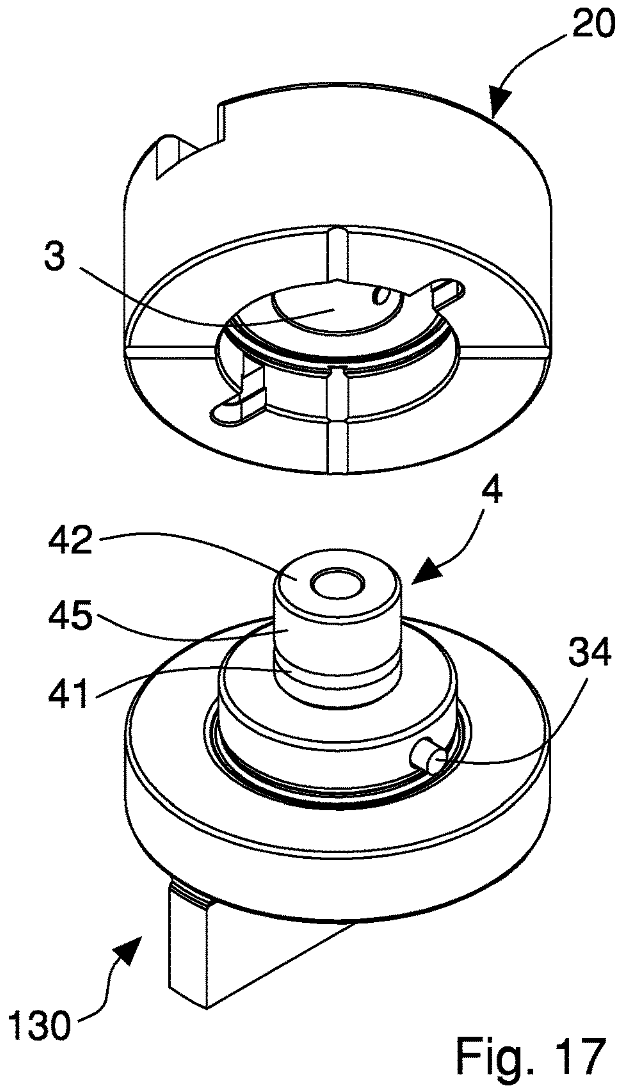
Fig. 17

Fig. 21
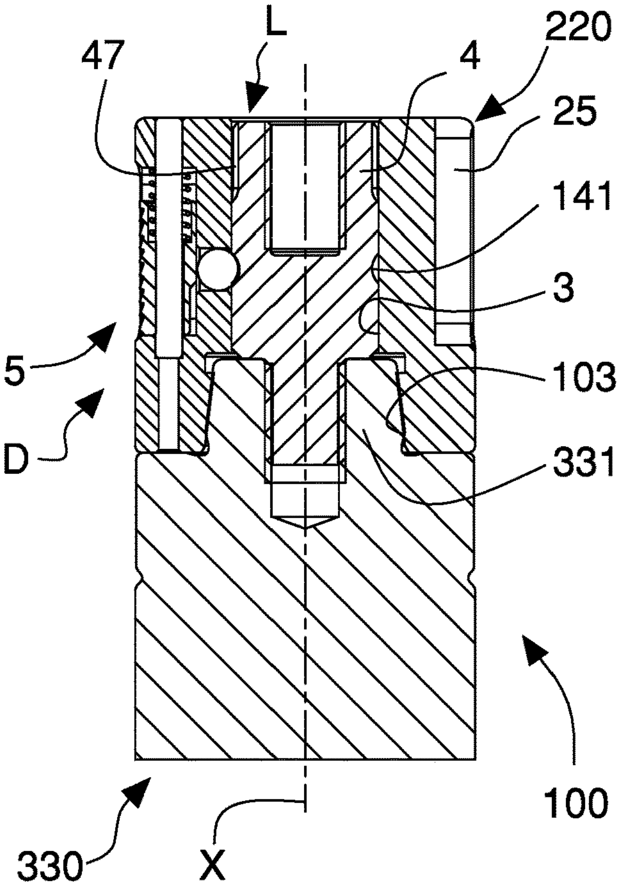
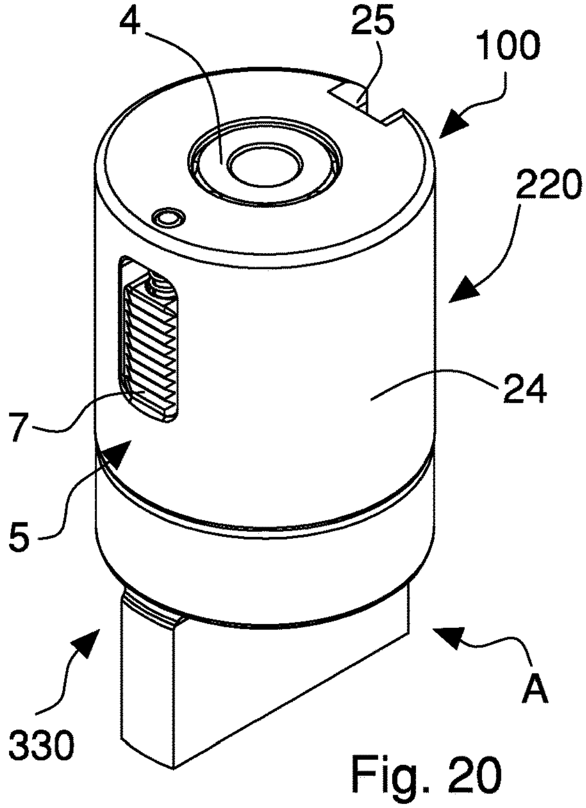
Fig. 20
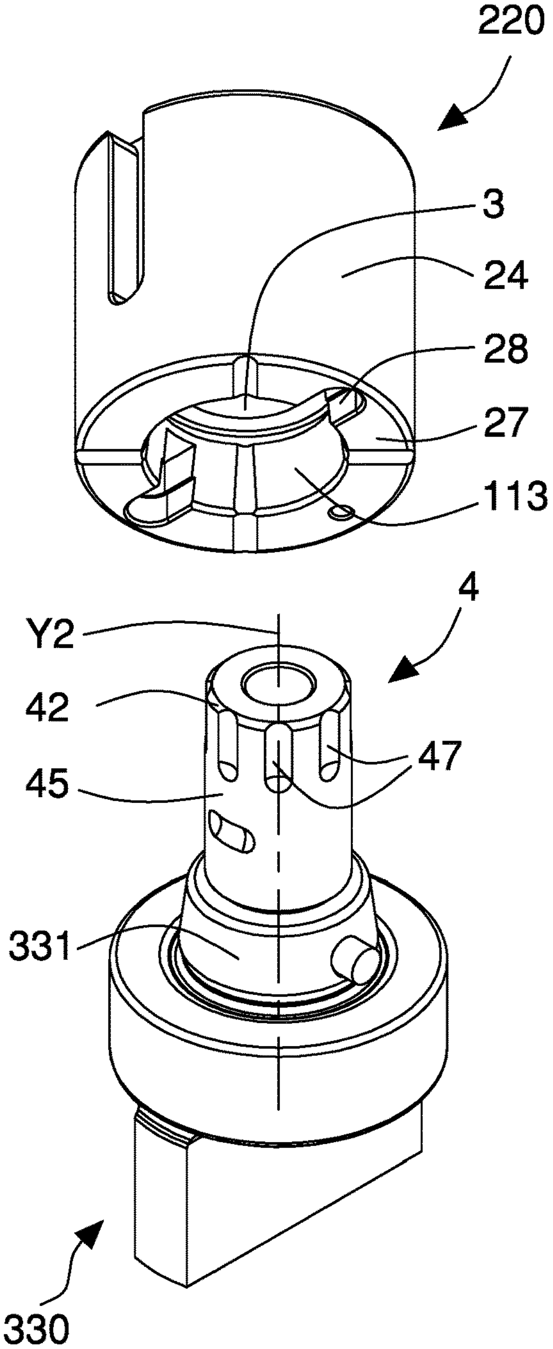
Fig. 22

PUNCH UNIT FOR PUNCHING MACHINE

The invention relates to machine tools for the machining of metal pieces and/or sheets and in particular it relates to a punch unit which comprises a punch tip holder and a punch tip and which can be associated with a respective punch holder of a punching machine to form a punching assembly. The invention also relates to a punch tip holder, a punching assembly and an interchangeable system of punch units for punch holders of punching machines.

A very widespread situation in the metal sheet machining sector is the presence in a single production site of a plurality of tools, typically punches or so-called punch tips, having different shapes and dimensions depending on the machining to be performed, and of related specific punch holders necessary for the assembly of the respective sets of punches on the punching machines so as to form corresponding punching groups or assemblies. Often the different tools are intended for the same operation or machining.

This situation has arisen as a result of the presence of a significant number of manufacturers, each of which has input its own system of punches and related punch holders on the market, each system being generally incompatible with the others. More precisely, the set of punches of a manufacturer can be mounted on a punching machine only having the specific and dedicated punch holder available, determining the need for users to have a wide range of punch holders and different series of tools.

As known, the punch holders are components mounted on the punching machine which allow to transfer the punching force of the press group of the machine to the punch tips to perform the machining. The punch holders which mount the respective punch tips form the punching assemblies or groups which can be associated individually or in groups to a single or multiple press group of the punching machine.

A punch holder typically comprises a tip holder element to which can be coupled a punch tip for use and a tubular guide body inside which the tip holder and the tip holder element can slide. The latter is connected and actuated axially, so as to move the punch tip against the sheet or piece to be worked along an operating stroke, by an actuating element which is in turn driven by a ram hammer of the press group or is directly connected to the press group. Generally, the coupling between the tip holder element and the actuating element is axially adjustable to allow the stroke of the punch tip to be varied (e.g., after being sharpened).

A plurality of springs, the so-called spring pack, fixed to the tubular guide body acts on the actuating element to return it to the initial position after the operating stroke.

The punch holders are therefore rather complex and therefore expensive components.

A very felt need in the market is therefore that of being able to maintain the supply of punch holders to a minimum.

An object of the present invention is to improve the known systems of punches and punch holders for punching machines.

Another object is to provide a punch unit which allows the same set of punch tips to be mounted on different punch holders to form respective punching groups of a punching machine.

A further object is to provide a punch unit which allows the punch tips to be replaced quickly and easily in order to reduce the stopping times of the punching machine.

Still another object is to provide a punch unit which allows a punch tip to be reversibly while firmly and reliably fixed to a respective punch holder.

Another further object is to provide an interchangeable system of punch units which allows to use the same set of punch tips on a plurality of different punch holders.

In one aspect of the invention, a punch unit according to claim 1 is provided.

In a second aspect of the invention, a punch tip holder according to claim 16 is provided.

In a third aspect of the invention, a punching assembly according to claim 17 is provided.

In a fourth aspect of the invention, an interchangeable system of punch units according to claim 18 is provided.

The invention can be better understood and implemented with reference to the attached drawings which illustrate some exemplifying and non-limiting embodiments thereof, wherein:

FIGS. 1 and 2 are two perspective views of a punch unit of the invention comprising a punch tip and a punch tip holder and mountable on a respective punch holder of a punching machine to form a punching assembly;

FIG. 3 is a front view of the punch unit of FIG. 1;

FIG. 4 is a section according to plane Iv-Iv of FIG. 3 which illustrates in particular locking means arranged in a locked condition for locking the punch tip to the punch tip holder in an assembled configuration;

FIG. 8 is a perspective view of a variant of the connecting element of the punch unit of the invention;

FIG. 9 is a perspective view of another variant of the connecting element of the punch unit of the invention;

FIGS. 10 and 11 are respectively perspective and top plan views of a further variant of the connecting element of the punch unit of the invention;

FIG. 12 is a cross section of the punch unit of the invention comprising a variant of the punch tip holder suitable for receiving the connecting element of FIG. 11 in the assembled configuration;

FIG. 14 is a front view of a variant of the punch unit of the invention which can be installed on a respective punch holder of a punching machine;

FIG. 15 is a section according to plane XV-XV of FIG. 14 which shows in particular the locking means in a locked condition for locking the punch tip to the punch tip holder in the assembled configuration;

FIG. 16 is a perspective view of the punch unit of FIG. 14;

FIG. 17 is a perspective view of the punch unit of FIG. 14 in a disassembled configuration;

FIG. 20 shows a perspective view of another further variant of the punch unit of the invention;

FIG. 21 is a cross-section of the punch unit of FIG. 20 which shows in particular the locking means in a locked condition for locking the punch tip to the punch tip holder in the assembled configuration;

FIG. 22 is a perspective view of the punch unit of FIG. 20 in a disassembled configuration.

Figure 7:
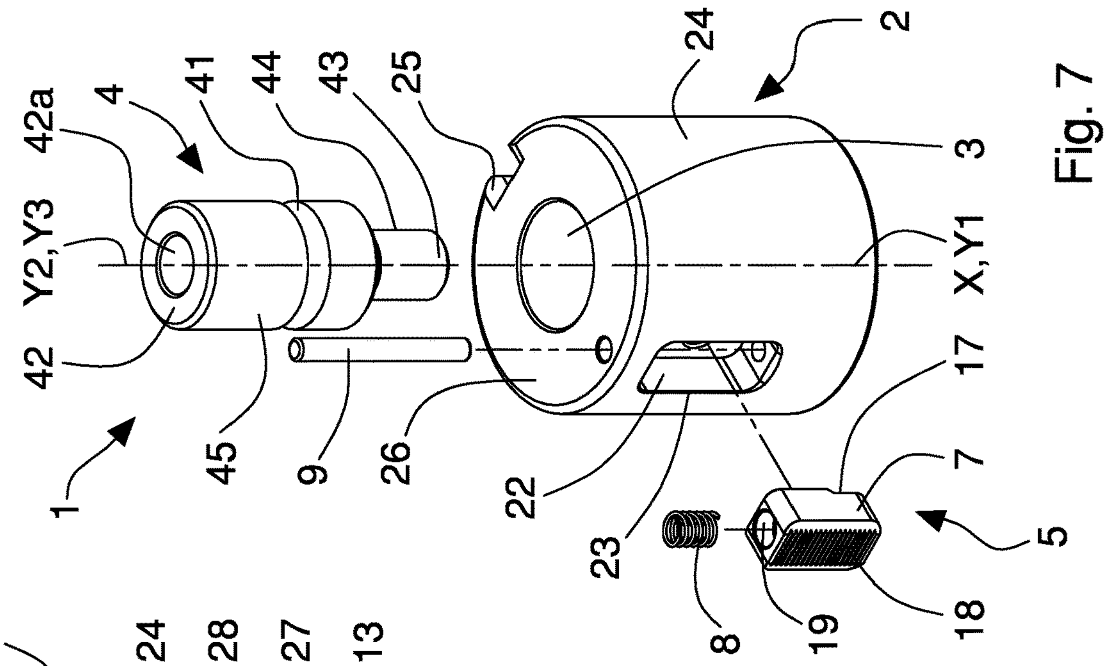
FIG. 7 is a partial perspective and exploded view of the punch tip holder of the punch unit of FIG. 1.
Figure 6:
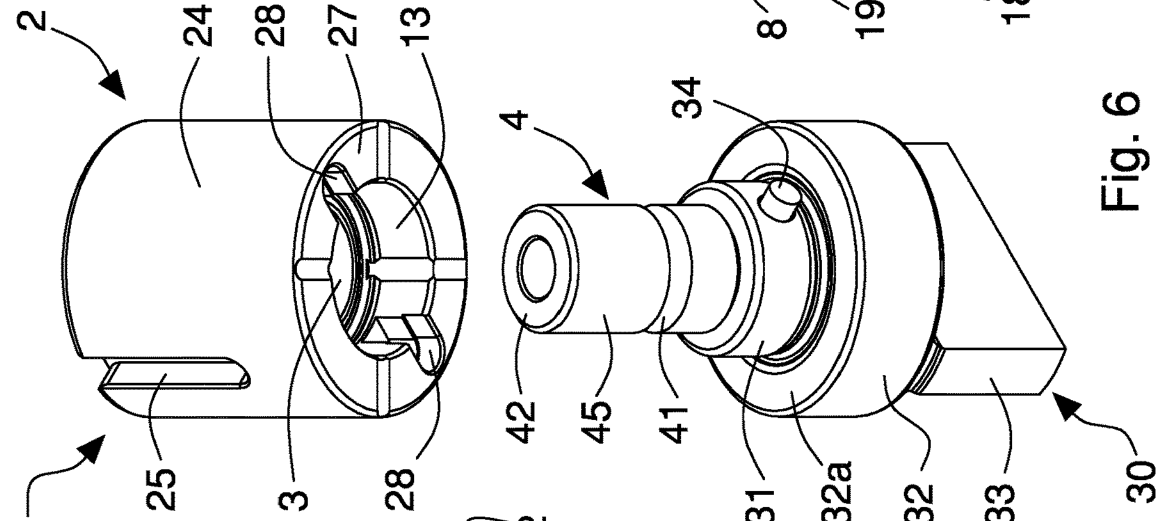
FIG. 6 is a perspective view of the punch tip holder and of the punch tip of FIG. 1 in a disassembled configuration.
Figure 5:
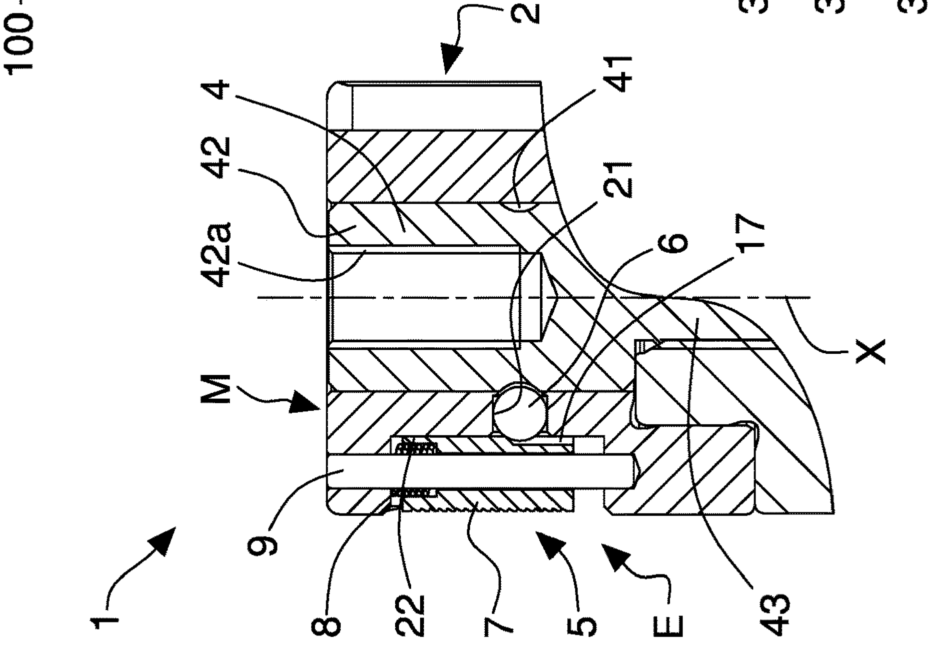
FIG. 5 is an enlarged partial section like that of FIG. 4 which illustrates the locking means in an unlocked condition of the punch tip.

With reference to FIGS. 1-7 and 13, the invention punch unit 100 is shown, associable with a respective punch holder 50 of a punching machine to form a punching assembly 60.

The punch unit 100 includes a punch tip holder 1 mountable on the respective punch holder 50 and a punch tip or punch 30 housed in, and connected to, said punch tip holder 1 in an assembled configuration A.

The punch tip holder 1 comprises a connecting element 4, an adapter element 2 and locking means 5.

The connecting element 4 is reversibly coupled to the punch tip 30 and the adapter element 2 or tip holder body is provided with an inner cavity 3 suitable for housing the connecting element 4 with the punch tip 30 in the assembled configuration A and is shaped and sized so as to be inserted and housed in the respective punch holder 50.

The adapter element 2 for example has a cylindrical shape and extends along a central axis X and the inner cavity 3 is a through cavity and extends along a first longitudinal axis Y1 for the entire length of the adapter element. The central axis X and the first longitudinal axis Y1 are parallel.

The locking means 5 are housed in the adapter element 2, which can be operated manually, without tools, and are arranged for locking or unlocking the connecting element 4 with the punch tip 30 to or from the adapter element 2.

The adapter element 2 is one of a plurality or set of adapter elements 2, each of which is shaped and sized to be inserted and mounted on a guide body 53 of a specific and respective punch holder 50. Similarly, the punch tip 30 is one of a plurality or set of punch tips 30, which can be mounted on a specific adapter element 2 of the set of adapter elements, and configured to perform a respective machining on a piece.

As better explained in the description that follows, the punch tip holder 1 of the punch unit 100 of the invention is substantially a shaped and sized adapter (in particular the adapter element 2) for coupling with a specific punch holder 50 and capable of receiving and assembling a plurality of different punch tips 30 which form a tool set or tool kit which allows to perform all the machining required on the punching machine. In the embodiment illustrated in FIGS. 1-7 and 13, the punch tip holder 1 of the punch unit 100 is shaped and sized to allow the punch unit 100 to be inserted and locked on the punch holder 50 of FIG. 13 arranged for the assembly on a tall turret (Station C) of a punching machine.

The locking means 5 comprise a locking element 6 slidably housed in a first seat 21 of the adapter element 2 and arranged to engage in a locked condition L a locking seat 41 made on the connecting element 4. The locking element 6 has a spherical shape, for example.

The locking means 5 also includes an actuating element 7 acting on the locking element 6 at least to maintain the latter in the locked condition L. More in detail, the actuating element 7 is slidably housed in a second seat 22 of the adapter element 2 and can be operated manually between an engagement position D, wherein it pushes and maintains the locking element 6 engaged with the locking seat 41 of the connecting element 4 in the locked condition L, and a release position E, wherein it allows the locking element 6 to disengage from the locking seat 41 in an unlocked condition M to allow the connecting element 4 and the punch tip 30 to be removed and disassembled from the adapter element 2, for example for the quick replacement of the punch tip 30. More precisely, the actuating element 7 comprises a disengagement seat 17 suitable to receive partially the locking element 6 in the unlocked position M in order to allow disengagement of the locking element 6 from the locking seat 41.

The second seat 22 substantially comprises a cavity made on a side wall 24 of the adapter element 2 and having an elongated shape in the longitudinal direction, i.e. parallel to the central axis X. The second seat 22 is connected to the inner cavity 3 through the first seat 21 which comprises, in particular, a cylindrical through hole having a diameter such as to house the spherical locking element 6 with play.

The actuating element 7 has a driving portion 18 accessible from an access opening 23 of the second seat 22 provided on the side wall 14. The driving portion 18 has a surface with protrusions and grooves, for example a knurling, to facilitate manual actuation by the operator using fingers.

The locking means 5 also include a guide pin 9 inserted in the second seat 22 parallel to the central axis X to guide and support the actuating element 7 in the movement between the engagement position D and the release position E. For this purpose, the actuating element 7 is provided with a longitudinal hole 19 adapted to receive the guide pin 9 (FIG. 7). The latter is fixed at its opposed ends, for example by forced coupling with two fastening holes made on the adapter element 2.

The locking means 5 further comprise elastic means 8 acting on the actuating element 7 to maintain the latter in the engagement position D. In the illustrated embodiment, the elastic means 8 include a helical spring acting in compression, mounted on the guide pin 9 and interposed between the actuating element 7 and a wall of the second seat 22.

The connecting element 4 comprises a first end 42 which can be reversibly coupled to an actuating element 56 of the punch holder 50, in particular by means of fastening means 51, and an opposed second end 43 which can be reversibly coupled to a connecting portion 31 of the punch tip 30. More precisely, the first end 42 of the connecting element 4 comprises a first threaded seat 42*a* suitable for receiving fastening means 51 of the actuating element 56, while the second end 43 is fixed by threaded coupling to a second threaded seat 31*a* of the connecting portion 31 of the punch tip 30.

More in detail, the connecting element 4 comprises a main body 45 of cylindrical shape which extends along a second longitudinal axis Y2 and which includes the first end 42, on which the first threaded seat 42*a* is made, in particular suitable for receiving a screw of the fastening means 51, and a threaded shank 44 of cylindrical shape which includes the second end 43 for the insertion and threaded coupling in the second threaded seat 31*a* of the connecting portion 31 of the punch tip 30. The threaded shank 44 and the first threaded seat 42*a* of the first end 42 are coaxial with each other and extend along a third longitudinal axis Y3 parallel to the first longitudinal axis Y2.

In the embodiment shown in FIGS. 1 to 7, the third longitudinal axis Y3 of the first threaded seat 42*a* and of the threaded shank 44 is almost coincident with the second longitudinal axis Y2 of the main body 45, i.e. the first threaded seat 42*a*, the threaded shank 44 and the main body 45 are coaxial. Similarly, the first longitudinal axis Y1 of the inner cavity 3 is almost coincident with the central axis X of the adapter element 2, i.e. the inner cavity 3 is coaxial within the adapter element 2.

The locking seat 41 is made on the main body 45 of the connecting element 4, in particular comprising an annular groove, in particular arranged on a plane almost orthogonal to the second longitudinal axis Y2 of the main body 45 and having a shape complementary to that of the locking element 6, i.e. spherical convex.

Alternatively, as shown in the variant of FIG. 8 of the connecting element 4, the locking seat 141 can comprise a single recess having an elongated shape in a tangential direction with reference to the main body 45.

Still as an alternative, as shown in the variant of FIG. 9, the connecting element 4 can comprise a plurality of locking seats 241 comprising respective recesses arranged angularly spaced on the main body 45 around the second longitudinal axis Y2 and arranged on a plane almost orthogonal to the latter. Each locking seat 241 has a shape complementary to that of the locking element 6, i.e. a concave shape of a spherical cap. The plurality of spheres allows the connecting element 4 to be mounted on the adapter element 2 in different angular positions with respect to the central axis X.

A variant of the punch unit 100 of the invention is also provided, illustrated in FIGS. 10 to 12, wherein the main body 45, the first seat 42*a* and the threaded shank 44 are not coaxial in the connecting element 4, but the first seat 42*a* and the threaded shank 44 are eccentric with respect to the main body 45. More precisely, the first seat 42*a* and the threaded shank 44 are arranged with respect to the main body 45 so that the third longitudinal axis Y3 of the first threaded seat 42*a* and of the threaded shank 44 is distant from the second longitudinal axis Y2 of the main body 45 of an eccentricity value E.

To couple with this connecting element 4, the inner cavity 3 of the adapter element 2 is also not coaxial with the latter. More precisely, the first longitudinal axis Y1 of the inner cavity 3 is distant from the central axis X by the same eccentricity value E.

In the assembled configuration A of the punch unit 100, the threaded shank 44 and the first threaded seat 42*a* are coaxial to the adapter element 2, i.e. the third longitudinal axis Y3 coincides with the central axis X, while the second longitudinal axis Y2 of the main body 45 of the connecting element 4 almost coincides with the first longitudinal axis Y1 of the inner cavity 3.

The locking seat 241 made on the outer wall of the main body 45 comprises a single recess, having a shape complementary to that of the locking element 6, i.e. a concave shape of a spherical cap.

These variants of the locking seat 141, 241 (FIGS. 8 and 9) and of the punch tip holder 1 (FIGS. 10-12) help to prevent possible relative rotations around the central axis X between the connecting element 4 and the adapter element 2 in the assembled configuration A, in particular when the punch unit 100 is not mounted and fixed to the punch holder 50.

The adapter element 2 has, for example, a substantially cylindrical shape and comprises the outer side wall 24, an upper wall 26 and an opposed and parallel lower wall 27.

The external side wall 24 is provided with a longitudinal groove 25, in particular parallel to the central axis X and opening on the upper wall 26. The longitudinal groove 25 is arranged to receive an anti-rotation element 52 of the punch holder 50 which prevents rotation of the punch unit 100 around the central axis X once mounted on the punch holder 50, said central axis X coinciding with an actuation axis Z of the punch holder 50.

The through inner cavity 3 preferably has a cylindrical shape and comprises a connecting seat 13, that is, an enlarged portion also of a cylindrical shape, opening on the lower wall 27 of the adapter element 2 and arranged to house the connecting portion 31 of the punch tip 30.

The connecting portion 31 is substantially a protrusion, for example cylindrical, which extends from a central body 32 of the punch tip 30. An operating portion 33, defining the tool or punch end, extends from the central body 32 on the opposite side with respect to the connecting portion 31. The shape and dimensions of the operating portion 33 change according to the machining to be performed.

In the assembled configuration A, the lower wall 27 of the adapter element 2 is arranged to abut a connecting wall 32*a* of the punch tip 30, in particular said connecting wall 32*a* being made on the central body 32.

The adapter element 2 also comprises one or more recesses 28 opening on the connecting seat 13 and on the lower wall 27 and arranged to receive a respective anti-rotation element 34 of the punch tip 30 in the assembled configuration A so as to prevent a relative rotation between the adapter element 2 and the punch tip 30 around the central axis X. More precisely, the adapter element 2 comprises two recesses 28 that are opposed, that is angularly spaced 180° with respect to the central axis X and suitable for receiving an anti-rotation element 34 of the punch tip 30 comprising a pin radially protruding from the central body 32.

In use, the punch tip 30 to be used, chosen from a plurality or set of punch tips for the realization of a wide range of machining on metal pieces and sheets, is associated with a connecting element 4, in particular simply screwing the second end 43 of the latter into the second threaded seat 31*a* of the connecting portion 31 of the punch tip 30.

At this point the punch tip 30 can be mounted on the adapter element 2 of the punch tip holder 1 to form the punch unit 100, inserting the main body 45 of the connecting element 4 and the connecting portion 31 of the punch tip 30 in the inner cavity 3 of the aforesaid adapter element 2. This operation is carried out by maintaining the actuating element 7 of the locking means 5 in the release position E to allow the free movement of the locking element 6 inside the disengagement seat 17 and not to block the sliding of the connecting element 4 in the inner cavity 3.

When the lower wall 27 of the adapter element 2 and the connecting wall 32*a* of the punch tip 30 have come into contact, the actuating element 7 can be released to allow the elastic means 8 to return it to the engagement position D in which the actuating element 7 pushes and maintains the locking element 6 against the locking seat 41 of the connecting element 4 in the locked condition L.

The punch unit 100 with the punch tip holder 1 and the required punch tip 30 associated to it and conveniently constrained due to the locking means 5 can then be mounted on the punch holder 50 of the punching machine to form the punching assembly 60 and therein locked to the actuating element 56 by means of a fixing screw 51 which engages in the first threaded seat 42*a* made on the first end 42 of the connecting element 4.

During the production process, if its required to replace the punch tip 30 with a different punch tip, it is sufficient to simply disengage the fixing screw 51 from the connecting element 4, extract the punch unit 100 from the punch holder 50 and then, acting on the locking means 5, extract and separate the punch tip 30 and the connecting element 4 from the adapter element 2.

A different punch tip 30, possibly already connected to a respective connecting element 4, can then be inserted and blocked in the adapter element 2 due to the locking means 5. The punch unit 100 carrying a different punch tip 30 can then be inserted and fixed to the punch holder 50 to form the desired punching assembly 60.

Alternatively, the same punch tip 30 can be used on a different punch holder 1 to form a punch unit 1 to be mounted on a different specific punch holder 50.

It should be noted that the shape and dimensions of the adapter element 2 of the punch tip holder 1 are defined on the basis of the shape and dimensions of a mounting cavity 54 of the specific punch holder 50 on which the punch tip 30, and in particular the whole set of punch tips to which it belongs, is to be used. Similarly, the shape and dimensions of the inner cavity 3 are defined on the basis of the shape and dimensions of the connecting portion 31 of a specific set of punch tips.

Figure 13:
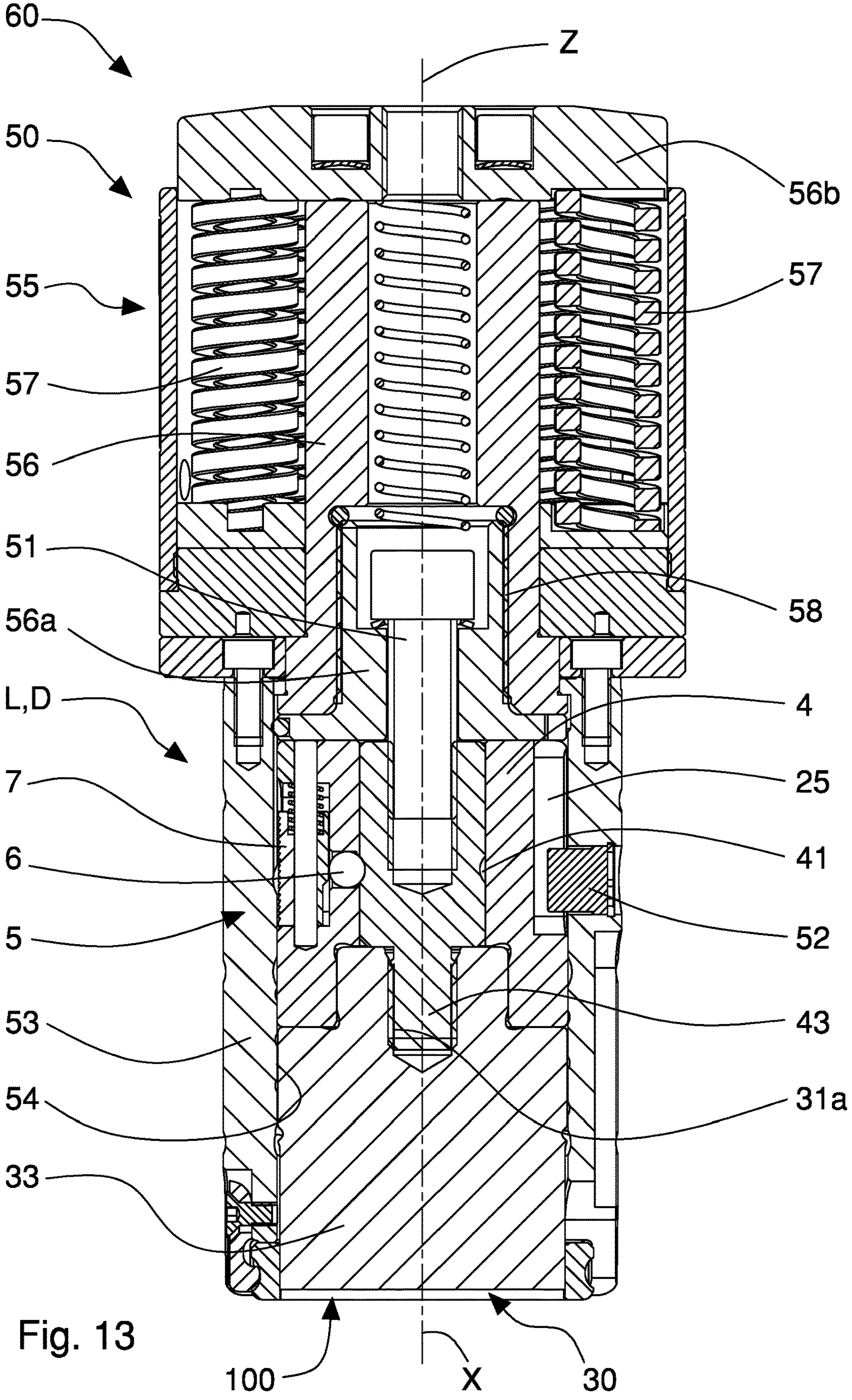
FIG. 13 is a cross-section showing the punch unit of FIG. 1 mounted on a respective punch holder to form a punching assembly.

With particular reference to FIG. 13, a punching assembly 60 is illustrated comprising a punch holder 50, of a known type and therefore not described in detail, with which the punch unit 100 of the invention is associated.

The punch holder 50, of a known type and therefore not described in detail, comprises a guide body 53 which has the mounting cavity 54 suitable for receiving the specific adapter element 2 of the punch unit 100 of the invention and an actuating group 55 adapted to transmit the punching force from a ram hammer of the press group of the punching machine, not shown, to the punch tip 30.

The actuating group 55 comprises, e.g., an actuating element 56 movable along an actuation axis Z and provided with a first part 56*a*, connectable through the fixing screw 51 to the connecting element 4 of the punch unit 100, and of a second part 56*b* suitable for interacting with the ram hammer of the press group. The two parts are constrained by means of a threaded coupling 58 to allow their relative rotation around the actuation axis Z in order to adjust the stroke of the punch tip 30.

The actuating group 55 also comprises elastic means 57, the so-called "spring pack", interposed between the hammer element 56 and the guide body 53 and arranged to return the latter to a raised position (to disengage the punch tip 30 from the worked piece) after the actuation of the ram hammer.

With reference to FIGS. 14 to 17, a variant of the punch unit 100 of the invention is shown, which differs from the embodiment previously described and illustrated in figures from 1 to 7 substantially for the different dimensions of the adapter element 20 and of the punch tip 130, in this case arranged to be mounted on a specific punch holder for the mounting on a tall turret, Station D of a punching machine.

The connecting element 4 which allows the punch tip 130 to be reversibly coupled to the adapter element 20 is the same used for the embodiment of FIGS. 1 to 7.

The locking means 5 differ in this variant in that they comprise, due to the larger dimensions of the adapter element 20 and of the first seat 21, a plurality of spherical locking elements 6, for example three, arranged aligned and in contact, a first outermost locking element 6 arranged to abut the locking seat 41 of the connecting element 4, a second outermost locking element 6 arranged to abut the actuating element 7, a third inner locking element 6 transferring the thrust between the outermost locking elements 6.

The operation of this variant of the punch unit 100 of the invention is identical to the one previously described.

Figure 19:
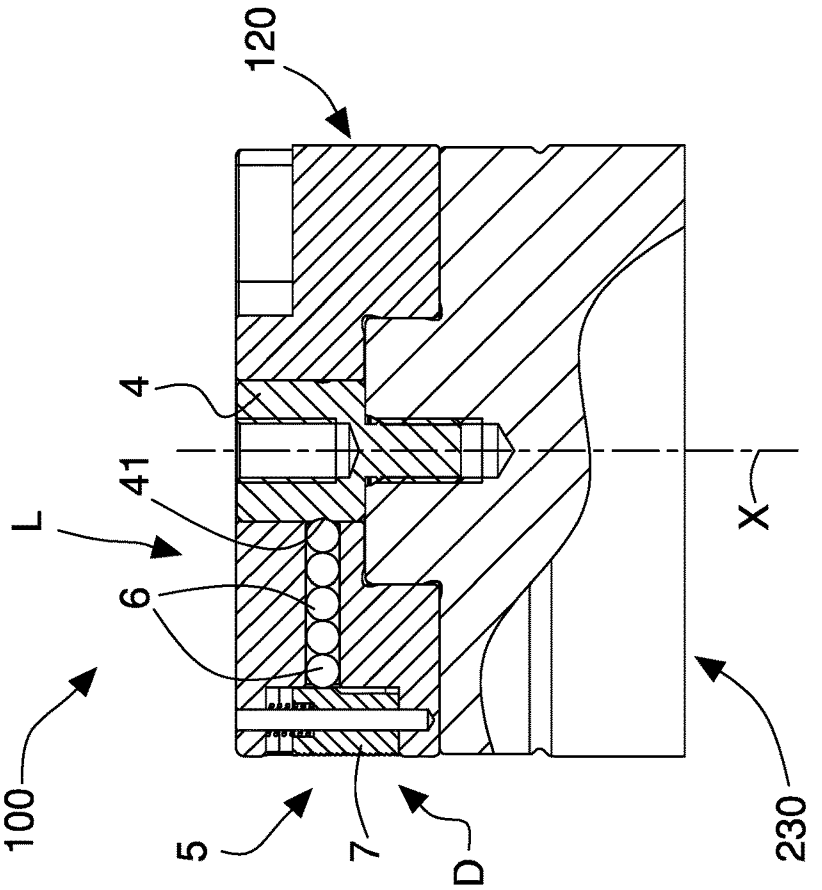
FIG. 19 is a cross-section of the punch unit of FIG. 18 which shows in particular the locking means in a locked condition for locking the punch tip to the punch tip holder in the assembled configuration.
Figure 18:
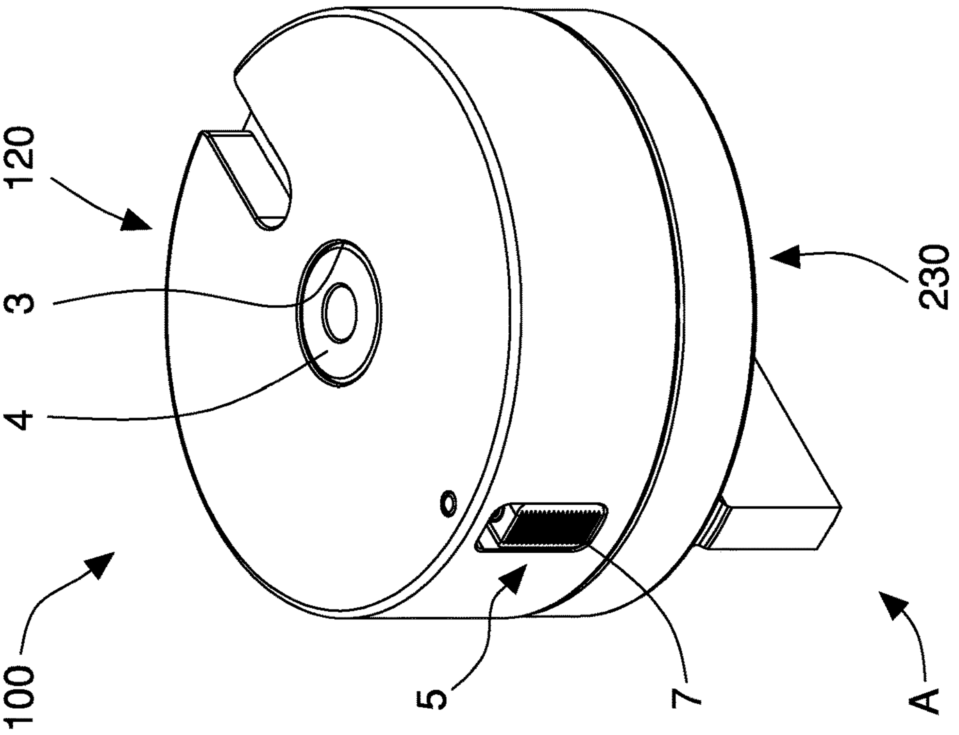
FIG. 18 is a perspective view of another variant of the punch unit of the invention which can be installed on a respective punch holder of a punching machine.

With reference to FIGS. 18 and 19, another variant of the punch unit 100 of the invention is shown which differs from the embodiments previously described for the different dimensions of the adapter element 120 and of the punch tip 230 in this case arranged to be mounted on a respective punch holder for the mounting on a tall turret, Station E of a punching machine.

The locking means 5, due to the larger dimensions of the adapter element 2 and of the first seat 21, comprises a larger number of spherical locking elements 6, for example five, arranged aligned and in contact, a first outermost locking element 6 arranged to abut the locking seat 41 of the connecting element 4, a second outermost locking element 6 arranged to abut the actuating element 7, three innermost locking elements 6 transferring the thrust between the outermost locking elements 6.

The operation of this variant of the punch unit 100 of the invention is identical to the one previously described.

With reference to FIGS. 20 and 22, a further variant of the punch unit 100 of the invention is illustrated which differs from the embodiment previously described and illustrated in FIGS. 1 to 7, due to the shape of the inner cavity 3 of the adapter element 220 which comprises a connecting seat 113 having a truncated cone shape suitable for receiving a connecting portion 331 of a punch tip 330 having a complementary truncated cone shape. Such conical coupling between the punch tip 330 and the punch tip holder 1 ensures better mounting precision.

In this version of the punch unit 100, the connecting element 4, substantially similar to that used for the embodiments previously described, comprises a first end 42 provided with a plurality of longitudinal grooves 47 parallel to the second longitudinal axis Y2 of the main body 45 and angularly spaced around said second longitudinal axis Y2 ensuring a better grip for the operator when he has to screw or unscrew the connecting element 4 to the punch tip 330. The longitudinal recesses 47 can be replaced by an appropriate knurling performed on the side wall of the main body 45.

The operation of this variant of the punch unit 100 of the invention is identical to the one previously described.

Due to the punch unit 100 of the invention it is therefore possible for a user in a production site to have a plurality of punch tip holders 1, each of which is configured to be mounted on a respective punch holder 50 of one or more punching machines available to the user to allow the same set of punch tips 30 to be used on all punch holders 50 even if different, for example because they are produced by different manufacturers, and to create the required punch tips 100. Each punch tip 30 is shaped and sized to perform a respective machining and can be mounted indifferently on each of the plurality of punch tip holders 1 thanks to the adapter elements 2 of the punch tip holders 1.

An interchangeable system of punch units 100 according to the invention is therefore provided comprising a plurality of punch tip holders 1, each configured to be mounted on a respective specific punch holder 50 of a punching machine without carrying out any modification to the latter, and a series or set of punch tips 30 each of which is suitable for carrying out a respective machining and can be mounted on each of a plurality of punch tip holders 1.

Due to the punch unit 1 and the related interchangeable system of punch units of the invention it is therefore possible to use a single kit or set of punch tips 30 on a plurality of different punch holders 50 so as to provide greater production flexibility and limit the purchase and management costs of the punch holders and of the punch tips.

The invention claimed is:

1. A punch unit associable with a respective punch holder of a punching machine to form a punch assembly, the punch unit comprising a punch tip holder mountable on the respective punch holder and a punch tip housed in, and connected to, said punch tip holder in an assembled configuration, said punch tip holder including:

a connecting element coupled to said punch tip;

an adapter element shaped and sized so as to be inserted and housed in the respective punch holder and provided with an inner cavity suitable to house said connecting element with said punch tip in the assembled configuration; and a locking device housed in said adapter element, said locking device being configured to be operated manually without tools and arranged for locking or unlocking said connecting element with said punch tip to or from said adapter element, wherein said connecting element comprises a first end, which is configured to be coupled to an actuating element of the respective punch holder, and an opposed second end, which is configured to be coupled to a connecting portion of said punch tip, wherein said first end of said connecting element comprises a first threaded seat suitable to receive a fastening element of the actuating element, and wherein said opposed second end of said connecting element is configured to be inserted and fixed by threaded coupling to a second threaded seat of said connecting portion of said punch tip.

2. The punch unit according to claim 1, wherein said adapter element is one of a plurality of adapter elements each of which is shaped and sized to be inserted and mounted on a guide body of a respective punch holder, and said punch tip is one of a plurality of punch tips each of which configured to perform a respective machining.

3. The punch unit according to claim 1, wherein said locking device comprises at least one locking element, slidably housed in a first seat of said adapter element and arranged for engaging in a locked condition a locking seat of said connecting element, and an actuating element which is configured to be operated manually and act on said locking element at least to maintain said locking element in the locked condition.

4. The punch unit according to claim 3, wherein said actuating element is slidably housed in a second seat of said adapter element and is configured to be operated manually between an engagement position, wherein said actuating element pushes and maintains said locking element against said locking seat in the locked condition, and a release position, wherein said actuating element allows said locking element to move and disengage from said locking seat in an unlocked condition to allow said connecting element and said punch tip to be mounted on or removed from said adapter element.

5. The punch unit according to claim 4, wherein said actuating element comprises a disengagement seat suitable to partially receive said locking element in the unlocked condition.

6. The punch unit according to claim 4, wherein said second seat comprises an access opening provided on a side wall of said adapter element, said actuating element comprising a driving portion accessible from said access opening of said second seat.

7. The punch unit according to claim 3, wherein said locking device further comprises an elastic element acting on said actuating element to maintain said actuating element in an engagement position.

8. The punch unit according to claim 1, wherein said adapter element has a cylindrical shape and extends along a central axis and said inner cavity is a through cavity and extends along a first longitudinal axis, the central axis and the first longitudinal axis being parallel.

9. The punch unit according to claim 1, wherein said connecting element further comprises a main body of cylindrical shape which extends along a second longitudinal axis, wherein said main body comprises said first end provided with said first threaded seat, and a threaded shank of cylindrical shape which includes said opposed second end for the insertion and coupling in said second threaded seat of said connecting portion, and wherein said first threaded seat and said threaded shank are coaxial and extend along a third longitudinal axis, the second longitudinal axis and the third longitudinal axis being parallel.

10. The punch unit according to claim 9, wherein the third longitudinal axis of said first threaded seat and of said threaded shank is almost coincident with the second longitudinal axis of said main body, and a first longitudinal axis of said inner cavity is almost coincident with a central axis of said adapter element.

11. The punch unit according to claim 9, wherein said first threaded seat and said threaded shank are arranged with respect to said main body so that the third longitudinal axis of said first threaded seat and of said threaded shank is distant from the second longitudinal axis of said main body by an eccentricity value, wherein said inner cavity is made in said adapter element so that a first longitudinal axis of said inner cavity is distant from a central axis of said adapter element by the eccentricity, value, and wherein, in the assembled configuration, the second longitudinal axis of said main body is almost coincident with the first longitudinal axis of said inner cavity and the third longitudinal axis of said first threaded seat and of said threaded shank is almost coincident with the central axis of said adapter element.

12. The punch unit according to claim 1, wherein said adapter element has a cylindrical shape and comprises an external side wall provided with a longitudinal groove parallel to a central axis of said adapter element, said longitudinal groove leading to an upper wall of said adapter element and being arranged to receive an anti-rotation element of the respective punch holder.

13. The punch unit according to claim 1, wherein said inner cavity of said adapter element is a through cavity and comprises a connecting seat opening on a lower wall of said adapter element, said connecting seat being arranged to house said connecting portion of said punch tip.

14. The punch unit according to claim 13, wherein said connecting seat of said inner cavity and said connecting portion of said punch tip have complementary cylindrical or truncated cone shapes.

15. The punch unit according to claim 13, wherein said adapter element further comprises at least one recess opening on said connecting seat and said lower wall and arranged for receiving a respective anti-rotation element of said punch tip.

16. A punch tip holder which can be associated to a punch tip to form a punch unit mountable on a respective punch holder of a punching machine to form a punch assembly, the punch tip holder comprising:

a connecting element which is configured to be coupled to the punch tip;

an adapter element shaped and sized so as to be inserted and housed in the respective punch holder and provided with an inner cavity suitable for housing said connecting element with the punch tip in an assembled configuration; and a locking device housed in said adapter element, said locking device being configured to be operated manually without tools and arranged for locking or unlocking said connecting element with the punch tip to or from said adapter element, wherein said connecting element comprises a first end, which is configured to be coupled to an actuating element of the respective punch holder, and an opposed second end, which is configured to be coupled to a connecting portion of the punch tip, wherein said first end of said connecting element comprises a first threaded seat suitable to receive a fastening element of the actuating element, and wherein said opposed second end of said connecting element is configured to be inserted and fixed by threaded coupling to a second threaded seat of the connecting portion of the punch tip.

17. A punch group mountable on a punching machine and which can be actuated by a hammer element thereof, the punch group comprising a punch holder and a punch unit according to claim 1, said punch holder including:

a guide body having a mounting cavity suitable for slidingly receiving said punch unit; and an actuating element provided with a first part slidably housed in said mounting cavity and which is configured to be coupled to said connecting element of said punch unit and an opposed second portion suitable for interacting with the hammer element.

18. An interchangeable system of punch units according to claim 1 comprising:

a set of punch tip holders, each of which is configured to be mounted on a respective specific punch holder of a punching machine without modifying the respective specific punch holder; and a set of punch tips each of which is suitable for performing a respective machining and configured to be mounted on a punch tip holder of said set of punch tip holders.

* * * * *